Dec. 17, 1935.   E. ZIPPER ET AL   2,024,264
WHEEL FOR POWER DRIVEN VEHICLES AND THE LIKE
Filed May 2, 1933   2 Sheets-Sheet 1
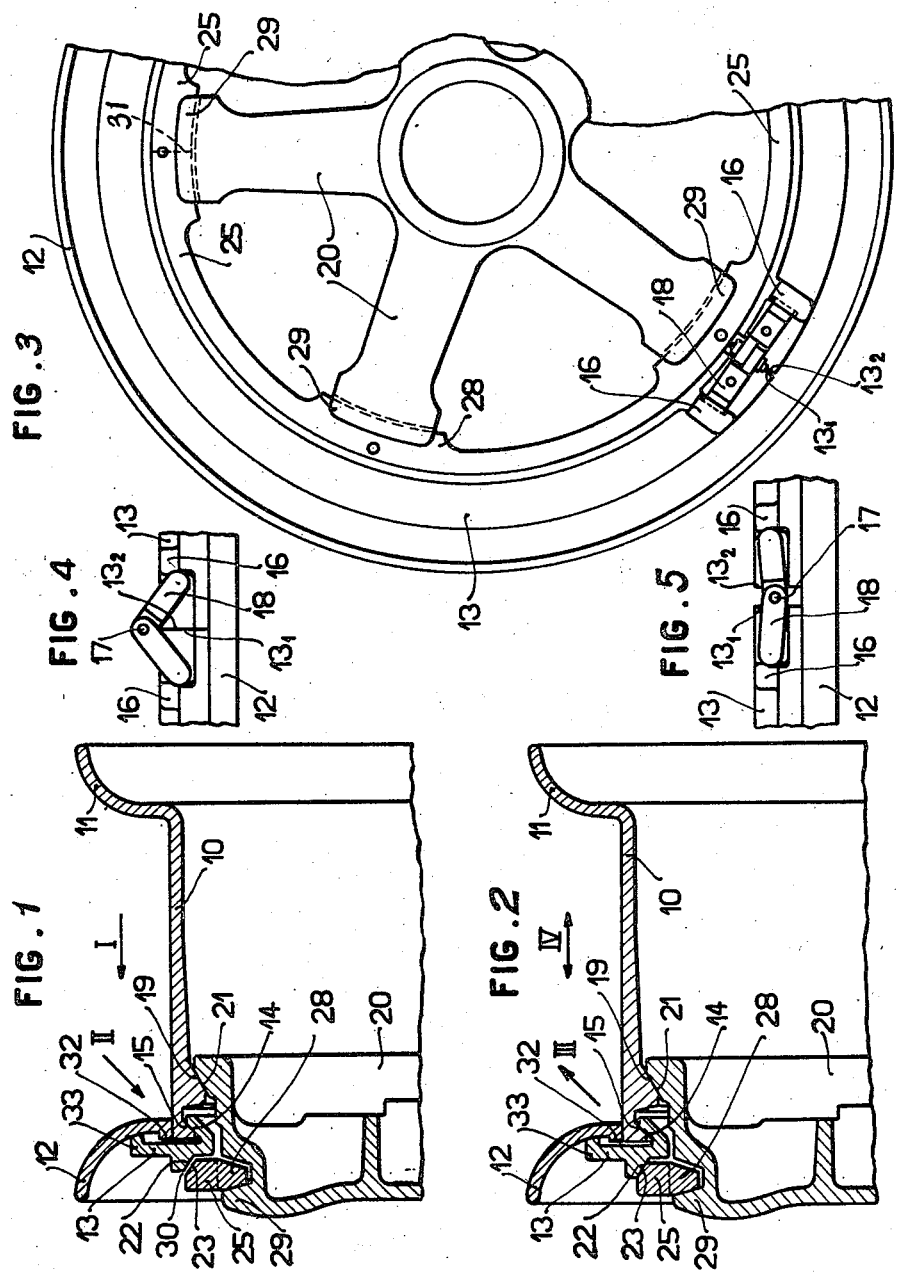
E. Zipper
W. Zipper   INVENTORS
By: Marks & Clerk
Attys.

Dec. 17, 1935.  E. ZIPPER ET AL  2,024,264
WHEEL FOR POWER DRIVEN VEHICLES AND THE LIKE
Filed May 2, 1933  2 Sheets-Sheet 2
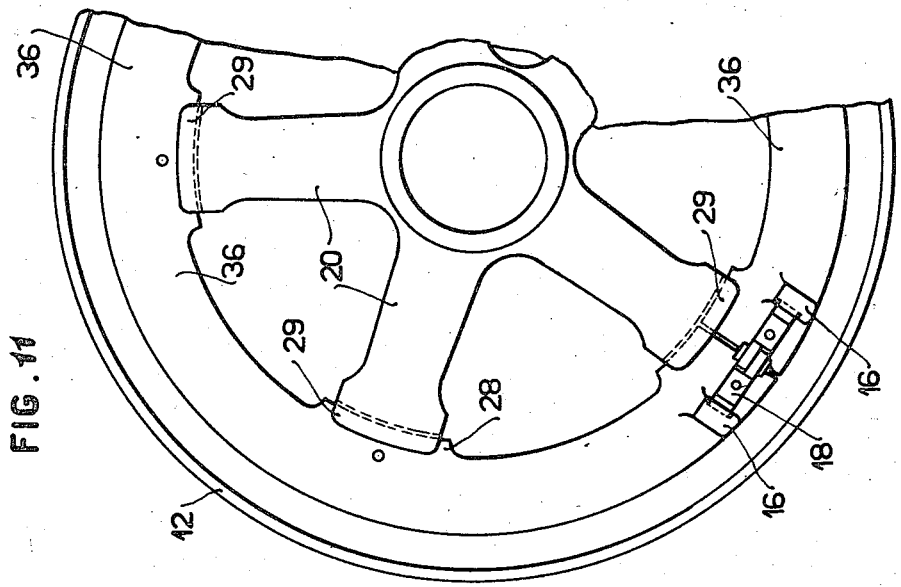
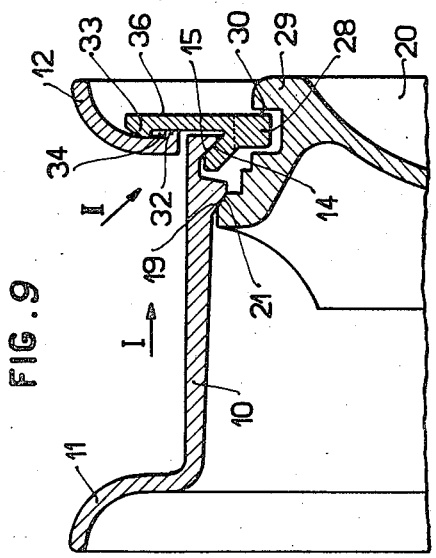
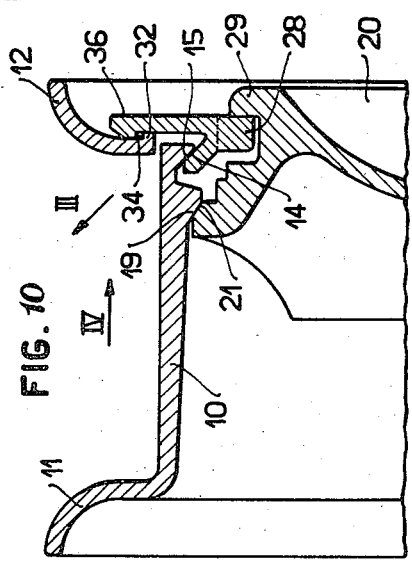
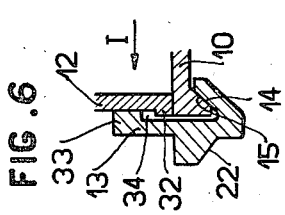
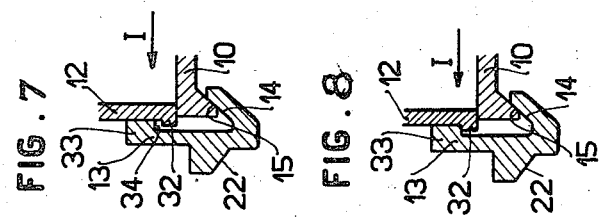
E. Zipper
W. Zipper
INVENTORS.
By: Marks & Clerk
Attys.

UNITED STATES PATENT OFFICE 2,024,264

WHEEL FOR POWER-DRIVEN VEHICLES AND THE LIKE

Emil Zipper and Walter Zipper, Vienna, Austria

Application May 2, 1933, Serial No. 669,048
In Austria April 19, 1932

12 Claims. (Cl. 301—12)

This invention relates to improvements in wheels for power-driven vehicles and the like. It is already known to provide such wheels with detachable rims which are adapted to be made fast to a fixed rim or to the body of the wheel by the internal pressure of the pneumatic tyre applied thereto, and which, to this end, are divided perpendicularly to the axis of the wheel into two portions which are detachably interconnected. With detachable rims of this type it becomes possible to carry the tyre in the fully inflated condition upon the rim with its felly portions interengaged, and to secure the same to the body of a wheel by slackening or releasing the connection between the said felly portions after the fitting of the rim (complete with its inflated tyre) on to the wheel.

The present invention relates to detachable rims of this nature, and consists essentially in the arrangement that the felly flange, which is detachable from the main portion of the rim, bears axially against an annular locking member which is connected to the main portion of the rim in such a manner as to be axially adjustable. This locking member takes the form of an open expanding ring, and is adapted to interlock with the main portion of the rim by means of surfaces or flanges which are conical, that is to say which are inclined at an angle to the axis of the wheel, so that, upon alteration of its diameter, this member is also proportionately displaced in an axial direction relatively to the main portion of the rim.

Constructional embodiments of the invention are shown, by way of example, in the accompanying drawings, in which:—

Figs. 1 and 2 show in axial section a constructional example of a rim in accordance with the invention, and the manner in which the same is associated with the body of the wheel.

Fig. 3 shows the wheel together with the rim, in side elevation.

Figs. 4 and 5 show the spreading means employed for expanding the locking ring.

Figs. 6 to 8 show the relative positions of the detachable felly flange and of the expanding locking ring.

Figs. 9 to 11 show a further modification of the invention, in the same views as those of Figs. 1 to 3.

Referring to the drawings, the detachable rim will be seen to consist of a main portion comprising the felly bed 10 with the one felly flange 11, and of a felly flange 12 which is detachable from the said main portion, each of these two parts taking the form of a closed annular body. The detachable felly flange 12 is slipped on to the cylindrical felly bed 10, and bears in an axial direction against a locking ring 13 which is so connected to the main felly portion that it, and therefore also the felly flange 12, on the one hand, and the main felly portion 10, 11, on the other hand, are capable of slight relative displacement in an axial direction (double arrow I, Fig. 1), without the connection between the locking ring 13 and the main felly portion becoming thereby entirely disengaged.

To this end, in the constructional example shown, the locking ring 13 takes the form of an open, that is to say split, ring the diameter of which can be increased by a small amount by the forcing apart of its ends $13_1$ and $13_2$ (Figs. 3 to 5). The expanding locking ring 13 and the main felly portion are provided with surfaces 14 and 15, respectively, which are parallel to each other, and which are inclined at an angle to the axis of the wheel; these conical surfaces 14 and 15 are adapted to interengage, and are so pitched or inclined that the locking ring 13 and the main felly portion are interconnected by means of these conical surfaces 14 and 15, the expanded condition of the locking ring being co-extant with a narrowing, and the contracted condition of this locking ring, on the other hand, with a widening of the complete detachable rim. Figs. 1 and 2 show the rim with the locking ring set in the expanded and in the contracted condition, respectively. When the locking ring 13 is contracted, the conical surface 14 is displaced in the direction of the arrow II (Fig. 1), and, when this ring is expanded, in the direction of the arrow III (Fig. 2), upon the conical surface 15, without these conical surfaces 14 and 15 being thereby brought completely out of engagement with each other.

In the non-tensioned condition the expanding locking ring 13 is contracted (Fig. 2), and this ring is provided with means for the increasing of its diameter and for its retention in the expanded condition (Fig. 1). The means provided consists, for example, of a toggle lever 18 (Figs. 3 to 5) the ends of which bear against lugs 16, 16 on the ends $13_1$ and $13_2$ of the locking ring 13. When this toggle lever 18 is transferred from the knuckled position shown in Fig. 4 to the position shown in Fig. 5 in which the joint pin 17 has passed somewhat beyond the fully spread position of the toggle lever, the locking ring 13 will thereby be slightly expanded.

The procedure in applying a pneumatic tyre to the above-described rim is as follows:

The toggle lever 18 is first lifted out and removed from the locking ring 13. The one end of the resilient locking ring 13 is then pressed slightly towards the middle of the wheel and drawn forward in an axial sense, so that the conical surfaces or flanges 14, 15 are brought out of engagement, first at one end and then along the entire circumference of the ring. After the removal of the locking ring 13 the felly flange 12 can also be removed from the main felly portion. The deflated pneumatic tyre and the flange 12 are then slipped, in this order, on to the main felly portion 10, 11. The expanding locking ring 13 is then refitted to the main felly portion 10, 11, again with one of its ends $13_1$ or $13_2$ first and then along its entire circumference, so that the conical surfaces 14, 15 are brought into engagement with each other; the two parts of the rim, that is to say the detachable flange 12 and the main portion 10, 11, are now interconnected by means of these conical surfaces 14, 15, while the locking ring 13 is still in the contracted condition (Fig. 2). The toggle lever 18 is then inserted (Fig. 4) and forced into the stretched position (Fig. 5). The locking ring 13 is thereby expanded, its conical surface 14 being caused to slide slightly in the direction of the arrow III (Fig. 2) upon the conical surface 15 on the rim bed 10. The locking ring 13 thus retained in the expanded condition by the toggle lever 18 is now rigidly connected to the main portion 10, 11, and is therefore capable of taking up the axial thrust of the felly flange 12 (Fig. 1), so that the pneumatic tyre can be fully inflated upon the rim, after the latter has been removed from the body of the wheel upon which it was mounted. The closed felly flange 12 takes up the pressure exerted by the fully inflated tyre towards the middle of the wheel, so that this pressure is not brought directly to bear upon the cleavage $13_1$, $13_2$ in the expanding locking ring 13.

In the described condition, that is to say with the locking ring 13 retained in the expanded state (Fig. 1), the rim together with the fully inflated tyre mounted thereon can be carried on a vehicle as a spare.

The main portion 10, 11 of the detachable rim is provided with a conical seating surface 19 (Figs. 1 and 2) with which it bears upon a similarly conical seating surface 21 on the body 20 of the wheel. The second, oppositely inclined, seating surface 22 on the detachable rim is provided on the expanded locking ring 13 (Figs. 1 and 2). This second seating surface 22 bears against a conical seating surface 23 which is provided on a counter-supporting member adjustably connected to the body 20 of the wheel. This adjustable counter-supporting member takes the form, in the constructional example shown in the drawings, of a ring 25 (Figs. 1 to 3) which is detachably connected to the body 20 of the wheel in the manner of a bayonet joint. For this purpose this ring is provided on its inner periphery with a number of radially inwardly projecting lugs or flaps 28, and is capable, by rotation about its own axis, of being brought into and out of engagement with radially outwardly projecting lugs 29 on the body 20 of the wheel.

To mount a spare rim of the described type on a wheel constructed to receive the same, the annular counter-supporting member 25 is first turned and removed, after which the spare rim, with a fully inflated tyre thereon and with its locking ring 13 fixed in the expanded condition (Fig. 1), is fitted on to the body 20 of the wheel, after which the annular counter-supporting member 25 is replaced and turned into the locking position (Figs. 1 and 3). Between the seating surfaces 23 and 22 on the annular counter-supporting member 25 and on the set expanded locking ring 13, respectively, there is thereby left a narrow gap 30 (Fig. 1), so that the detachable rim is not yet firmly attached to the body 20 of the wheel. The rigid connection between the expanding locking ring 13, on the one hand, and the main felly portion 10, 11, on the other hand, is then released by the lifting out and removal of the toggle lever 18 from the locking ring 13. The internal pressure of the pneumatic tyre then forces the two portions of the rim apart, as indicated by the arrow I in Fig. 1, the power exerted thereby being very great. Radially directed components of the internal pressure acting in an axial direction contract the locking ring 13, the conical surface 14 on the latter being thereby caused to slide slightly upon the conical surface 15 on the felly portion 10, as indicated by the arrow II (Fig. 1), without these surfaces 14 and 15 being brought completely out of engagement with each other. The internal pressure of the pneumatic tyre thus presses the felly flange 12 with great force against the locking ring 13, and the latter against the counter-supporting member 25, the rim being thereby firmly secured to the body 20 of the wheel (Fig. 2).

In order to replace a tyre which is in use but which has become defective, or, as is more often the case, to interchange the tyres of a rear and a front wheel, the ends $13_1$ and $13_2$ of the locking ring 13 are first forced apart slightly by means of the toggle lever 18, for which purpose this latter is inserted in the knuckled position (Fig. 4) and transferred into the stretched position (Fig. 5). In this manner the locking ring 13 is again slightly expanded, its conical surface 14 being thereby caused to slide a little in the direction of the arrow III (Fig. 2). With this latter movement the seating surface 22 on the locking ring 13 comes clear of the seating surface 23 on the counter-supporting member 25 (Fig. 1), so that this latter can be turned and removed from the body 20 of the wheel. The detachable rim with the inflated tyre thereon can then also be removed bodily and replaced either by a spare rim or by the rim of another wheel, after which the locking ring 13 of the newly applied rim is relieved of tension by the removal of the toggle lever 18 associated therewith, for the purpose of fixing this rim in position.

As will be clear from the above description, both for the attachment of the rim to the body of a wheel and for the detachment of the same it is merely necessary to actuate the spreading means for the locking ring 13, that is to say the toggle lever 18. All the movements of the parts concerned in these operations, that is to say in the alteration of the diameter of the locking ring 13, and the displacements indicated by the arrows I, II, and III (Figs. 1 and 2) are extremely small, and amount merely to a few millimetres.

The revolvable or axially adjustable connection of the locking ring 13 with the main portion 10 of the detachable rim obtained by the use of the conical surfaces 14 and 15 is the simplest and least expensive, but not the only possible, connection for the purpose concerned.

In the constructional example shown in the drawings the counter-supporting member, which is detachable from the body of the wheel, takes the form of a closed bayonet-jointing or claw-ring. This ring 25 can, however, also take the form of a transversely split expanding ring, as indicated in Fig. 3 by the broken line 31. The diameter of this annular counter-supporting member 25 can in this case be arranged to be enlarged and decreased in any suitable manner, for example by means of a wedge, a toggle lever, or a double-threaded screw spindle associated with the ends of the split ring. By such an arrangement of the annular counter-support 25 its seating surface 23 (Figs. 1 and 2) can be brought nearer to the seating surface 22 on the locking ring 13, so that the displacement and deformation of the locking ring 13 and the displacement of the felly flange 12 can be brought down to an extremely small amount, and the gap 30 (Fig. 1) be made almost negligible.

The detachable felly flange 12 is provided, in the vicinity of its inner edge, with an outwardly projecting annular step 32 which is overhung by an inwardly projecting and likewise annular step 33 provided on the expanding locking ring 13. Between these steps 32 and 33 there is left an annular space 34 (see Figs. 6 and 7); this intermediate space 34 is so dimensioned that it is diminished but not closed up when the rim shown in Fig. 2 is fixed in position on a wheel by the lifting out of the toggle lever 18. In other words, in consequence of the earlier closing of the gap 30 (Fig. 1) the space 34 can not be entirely closed up. On the other hand, this space 34 is so small that it is closed up before the conical surfaces 14 and 15 come out of engagement with each other, with the result that the conical surfaces 14 and 15 will not be capable of coming out of engagement with each other even if the toggle lever 18 should be mistakenly taken out of a rim carrying a fully inflated tyre but not mounted on the body 20 of the wheel, as above described. It will be clear that in this case the step 32 on the felly flange 12 arrests the step 33 on the contracted locking ring 13. Figs. 6, 7 and 8 show the relative positions of the felly flange 12, of the locking ring 13, and of the conical surfaces 14 and 15 in the three following junctures, respectively: When the locking ring 13 is spread to its larger diameter, as shown in Fig. 1; when the rim is attached to the body 20 of the wheel, as shown in Fig. 2; when the toggle lever 18 is mistakenly removed from an isolated rim carrying an inflated tyre, in which case the catching or safety device consisting of the annular steps 32 and 33 becomes operative.

The form of construction shown in Figs. 9–11 differs from that shown in Figs. 1–8 merely by the fact that the spreading locking ring 13, which is axially adjustably connected with the main felly portion 10, 11, and the annular counter supporting member 25 (Figs. 1–3), which bears against the body 20 of the wheel, are united to form a single ring 36. This ring 36 thus serves both for the locking of the detachable felly flange 12 to the main felly portion 10, 11, and also for the supporting of the detachable rim on the body 20 of the wheel. The application of the tyre to the rim and the mounting of the rim upon the wheel are effected as in the case of the form of construction shown in Figs. 1–5. The only difference consists in the fact that, in order to bring the lugs 28 and 29 into engagement with each other, not merely the ring 36 alone but the entire rim together with the tyre is rotated slightly after the fitting of the rim on to the body 20 of the wheel.

The form of construction shown in Figs. 9–11 is primarily intended for use in connection with lighter power-driven vehicles, and, as will be readily understood, this form provides the advantages of greater simplicity of construction, and of the possibility of more rapid assembly.

We claim:

1. A vehicle wheel comprising a wheel-body and a demountable rim, lateral seats associated with the wheel body for the demountable rim, the demountable rim consisting of a main portion and a detachable flange, an annular locking member for the detachable flange of the rim, means for connecting the annular locking member to the main portion of the rim, the annular locking member and the main portion of the rim connected with each other being movable relatively to each other in the direction of the wheel-axis by the inner pressure of an inflated tyre to clamp the main portion of the rim and the annular locking member between the lateral seats.

2. A vehicle wheel comprising a wheel-body and a demountable rim, lateral seats associated with the wheel body for the demountable rim, the demountable rim consisting of a main portion and a detachable flange, an annular locking member for the detachable flange of the rim, the main portion of the rim and the annular locking member having conical connecting surfaces engaging with each other, the annular locking member being transversely split, means for increasing it in diameter, the annular locking member and the main portion of the rim engaging with each other by the conical surfaces being movable relatively to each other in the direction of the wheel-axis by the inner pressure of an inflated tyre to clamp the main portion of the rim and the annular locking member between the lateral seats.

3. A vehicle wheel comprising a wheel-body and a demountable rim, lateral seats associated with the wheel body for the demountable rim, the demountable rim consisting of a main portion and a detachable flange, an annular locking member for the detachable flange of the rim, the main portion of the rim and the annular locking member having conical connecting surfaces engaging with each other, the annular locking member being transversely split, means for expanding the transversely split annular locking member to a larger diameter, and both the main portion of the rim and the annular locking member connected together fitting between the said lateral seats.

4. A vehicle wheel comprising a wheel-body and a demountable rim, the wheel body having a fixed lateral seat and a removable lateral ring seat for the demountable rim, means for locking the removable ring seat to the wheel body, the demountable rim consisting of a main portion and a detachable flange, an annular locking member for the detachable flange of the rim, the main portion of the rim and the annular locking member having conical connecting surfaces engaging with each other, the annular locking member being transversely split, means for increasing it in diameter, the annular locking member and the main portion of the rim engaging with each other by the conical surfaces being movable relatively to each other in the direction of the wheel-axis by the inner pressure of an inflated tyre to clamp the main portion of the rim and the annular locking member between the fixed seat and the removable seat of the wheel body.

5. A vehicle wheel comprising a wheel-body and a demountable rim, the wheel body having a fixed lateral seat and a removable lateral seat for the demountable rim, the demountable rim consisting of a main portion and a detachable flange, an annular locking member for the detachable flange of the rim, means for connecting the annular locking member to the main portion of the rim, the annular locking member and the main portion of the rim connected to each other being movable relatively to each other in the direction of the wheel-axis by the inner pressure of an inflated tyre to clamp the main portion of the rim and the annular locking member between the seats of the wheel body, the said removable lateral seat consisting of a transversely split ring, and means for interlocking the transversely split ring seat with the wheel body.

6. A vehicle wheel comprising a wheel-body or felly and a demountable rim, the wheel body having a fixed lateral seat and a removable lateral seat for the demountable rim, the demountable rim consisting of a main portion and a detachable flange, an annular locking member for the detachable flange of the rim, means for connecting the annular locking member to the main portion of the rim, the annular locking member and the main portion of the rim connected to each other being movable relatively to each other in the direction of the wheel-axis by the inner pressure of an inflated tyre to clamp the main portion of the rim and the annular locking member between the seats of the wheel body, the said removable lateral seat consisting of a transversely split ring, means for interlocking the transversely split ring seat with the wheel body and means for expanding the transversely split ring seat to a larger diameter.

7. A vehicle wheel comprising a wheel-body and a demountable rim, the wheel body having a fixed lateral seat and a removable lateral seat for the demountable rim, the demountable rim consisting of a main portion and a detachable flange, an annular locking member for the detachable flange of the rim, means for connecting the said annular locking member to the main portion of the rim, the annular locking member and the main portion of the rim connected to each other being movable relatively to each other in the direction of the wheel-axis by the inner pressure of an inflated tyre to clamp the main portion of the rim and the annular locking member between the seats of the wheel body, the said removable lateral seat consisting of a transversely split ring, means for expanding the transversely split ring seat to a larger diameter, the said removable lateral seat being interlocked with the wheel body in the manner of a bayonet-joint.

8. A vehicle wheel comprising a wheel-body and a demountable rim, the wheel body having a fixed lateral seat and a remountable lateral ring seat for the demountable rim, the said removable seat being transversely split, means for interlocking the removable ring seat with the wheel body, the demountable rim consisting of a main portion and a detachable flange, an annular locking member for the detachable flange of the rim, the main portion of the rim and the annular locking member having conical connecting surfaces engaging with each other, the annular locking member being transversely split, means for increasing it in diameter, the annular locking member and the main portion of the rim engaging with each other by the conical surfaces being movable relatively to each other in the direction of the wheel-axis by the inner pressure of an inflated tyre to clamp the main portion of the rim and the annular locking member between the fixed seat and the removable seat of the wheel body.

9. A vehicle wheel comprising a wheel-body and a demountable rim, the wheel body having a fixed lateral seat and a removable lateral ring seat for the demountable rim, the said removable ring seat being transversely split, means for expanding the removable ring seat to a larger diameter, means for interlocking the removable ring seat with the wheel body, the demountable rim consisting of a main portion and a detachable flange, an annular locking member for the detachable flange of the rim, the main portion of the rim and the annular locking member having conical connecting surfaces engaging with each other, the annular locking member being transversely split, means for increasing it in diameter, the annular locking member and the main portion of the rim engaging with each other by the conical surfaces being movable relatively to each other in the direction of the wheel-axis by the inner pressure of an inflated tyre to clamp the main portion of the rim and the annular locking member between the fixed seat and the removable seat of the wheel body.

10. A vehicle wheel comprising a wheel-body, and a demountable rim, the wheel body having a fixed lateral seat and a removable lateral ring seat for the demountable rim, the said removable ring seat being transversely split, means for expanding the removable ring seat to a larger diameter, the said removable ring seat being interlocking with the wheel body in the manner of a bayonet-joint, the demountable rim consisting of a main portion and a detachable flange, an annular locking member for the detachable flange of the rim, the main portion of the rim and the annular locking member having conical connecting surfaces engaging with each other, the anular locking member being transversely split, means for increasing it in diameter, the annular locking member and the main portion of the rim engaging with each other by the conical surfaces being movable relatively to each other in the direction of the wheel-axis by the inner pressure of an inflated tyre to clamp the main portion of the rim and the annular locking member between the fixed seat and the removable seat of the wheel body.

11. A vehicle wheel comprising a wheel-body and a demountable rim, the wheel body having a fixed lateral seat and a removable lateral ring seat for the demountable rim, means for locking the removable ring seat to the felly, the demountable rim consisting of a main portion and a detachable flange, an annular locking member for the detachable flange of the rim, the main portion of the rim and the annular locking member having conical connecting surfaces engaging with each other, the annular locking member being transversely split, the detachable flange of the rim and the annular locking member for the said flange being provided with catching means consisting of stops preventing a complete loosening of the annular locking member from the detachable flange under the inner pressure of an inflated tyre.

12. A vehicle wheel comprising a wheel-body and a demountable rim, the wheel body having a fixed lateral seat and a removable lateral ring seat for the demountable rim, means for locking the removable ring seat to the wheel body, the demountable rim consisting of a main portion and a detachable flange, an annular locking member for the detachable flange of the rim, the main portion of the rim and the annular locking member having conical connecting surfaces engaging with each other, the annular locking member being transversely split, the detachable flange of the rim being provided with an outwardly projecting annular stop, and an inwardly projecting annular stop provided on the annular locking member, the said stops being adapted to engage with each other under the inner pressure of the inflated tyre.

EMIL ZIPPER.
WALTER ZIPPER.